United States Patent Office 3,396,035
Patented Aug. 6, 1968

3,396,035
FREE FLOWING SHORTENING COMPOSITION
Gene L. Kessinger, Decatur, Ill., assignor to A. E. Staley Manufacturing Company, Decatur, Ill., a corporation of Delaware
No Drawing. Original application Dec. 16, 1963, Ser. No. 330,784. Divided and this application Apr. 28, 1966, Ser. No. 594,286
6 Claims. (Cl. 99—94)

ABSTRACT OF THE DISCLOSURE

A dry-to-the-touch shortening composition containing not more than 80% shortening and not less than 20% gelatinized starch, said gelatinized starch having a particle size which passes through a 40 mesh screen, a bulk density of from 4–10 pounds per cubic foot, a cold water solubility of not less than 20%, and a moisture content of not more than 11%. This composition can be used for preparing pie-dough mixes and the like.

---

This is a division of application Ser. No. 330,784, filed Dec. 16, 1963, and now abandoned.

My invention relates to new gelatinized, cold water soluble, low bulk density starch products. More particularly, my invention relates to new cold-water-soluble, low-bulk-density starch products which are especially effective as fat absorbents.

Dry baking mixes, such as sweet dough, biscuits, cake and pie crust mixes are made by incorporating shortening into flour and, depending on the particular product, other ingredients such as dried eggs, dried milk solids, yeast, baking powder, salt, etc. In order to produce satisfactory bakery products it is necessary that the mix contain sufficient shortening. For example, pie crusts of the highest quality should contain on a dry substance basis about 35 to 45% shortening. Such shortening levels create no particular problem when the bakery product is prepared in the home directly from the individual ingredients. However, when it is attempted to prepare dry mixes which must be packaged and then stored under varying temperature conditions for extended periods of time without caking or clumping, the high shortening levels present numerous problems. The principal problem is that when high levels of shortening are used the mix tends to cake and lose its free flowing property. Such a mix is unattractive and difficult to work into a suitable bakery product. Another disadvantage accompanying the use of high levels of shortening is that shortening tends to exude from the mix or "grease out" before a uniform mixture is obtained.

In order to overcome these problems, various solutions have been proposed. One solution is to incorporate into the mix a small amount of a fat absorbent material. This is best accomplished by first mixing all or a portion of the shortening with the amount of fat absorbent to be used in the baking mix and then adding this shortening mix to the other ingredients. Finely ground unmodified starch has been used as a fat absorbent in dry shortening mixes. However, its fat absorbing ability is generally considered to be inadequate for use in most dry mixes. It has recently been reported that microcrystalline cellulose is far superior to unmodified starch as a fat absorbing material. Microcrystalline cellulose, however, suffers from the disadvantages of being non-nutritive and much more expensive than starch.

It is, therefore, an object of the present invention to provide an inexpensive, nutritive, efficient fat absorbent for use in baking mixes.

It is a further object of the present invention to provide a dry shortening composition which contains a high ratio of shortening to shortening-absorbent.

It is a still further object of this invention to provide a new, gelatinized, cold-water-soluble, low-bulk-density starch which is suitable for a wide variety of uses.

Other objects and advantages of my invention will be apparent from the specification and claims which follow.

The objects of the present invention are obtained by the preparation and use of a gelatinized starch having a cold water solubility (C.W.S.) of not less than 80%, a bulk density (B.D.) of from 4 to 10 lbs. per cubic foot when measured at a particle size which is sufficiently small to allow not less than 99% of the starch to pass through a 40 mesh screen, and a moisture content of not more than 11% by weight based on the starch dry substance. The new gelatinized starch of my invention is conveniently prepared by the general extrusion method of the type described in U.S. Ser. No. 100,354 by Thomas F. Protzman and John A. Wagoner, filed Apr. 3, 1961. This method generally comprises intensely working or shearing a mixture of starch raw material and starch swelling agent such as water in a confining chamber at elevated temperatures up to 250° C. and at pressures above the autogenous vapor pressure of the starch-starch swelling agent mixture for a short period of time, usually ranging from about 0.5 to about 5 minutes, the working being sufficient to provide an adiabatic temperature rise of at least 50° C. in the worked mixture, and immediately after said working transferring the worked mixture through an extrusion orifice to a zone of substantially reduced temperature and pressure. After the extrusion, the dried product can be ground to the proper particle size.

The starch used to prepare my new gelatinized starch may be a naturally occurring starch, a modified starch, a dextrinized starch or a derivative of starch. We include pregelatinized starch and starch which can be gelatinized at a temperature below 250° C. Mainly from the standpoint of consistent production of a uniform product, we have found that it is preferable to utilize a dextrinized starch, or a modified starch such as an acid-hydrolyzed starch or an oxidized starch.

As previously stated, my new gelatinized starch must have a cold water solubility (C.W.S.) of not less than 80%. For the purpose of this invention, cold water solubility (C.W.S.) is defined as the percent by weight of starch which dissolves in water at 25° C. according to the following procedure:

1 gram of starch product ground to pass a 40 mesh screen is shaken 2 hours with 50 grams of distilled water at 25° C. in a 100 ml. Kohlrausch flask with a wrist-action shaker. Water is then added to the flask to the 100 ml. mark, the contents are mixed thoroughly, transferred to a 250 ml. round bottom centrifuge tube and centrifuged for 15 minutes at 2000 r.p.m. A 25 ml. aliquot of the clear centrifugate is transferred to a tared aluminum pan and evaporated to dryness on a steam bath. The dish is then dried to constant weight in an oven at 110° C. The weight of the dried material in the pan multiplied by 400 and divided by the dry starch weight of the original sample is the cold water solubility of the starch product.

Also, as previously stated, my new gelatinized starch must have a bulk density (B.D.) of from about 4 to about 10 pounds per cubic foot when measured at a particle size which is sufficiently small to allow not less than 99% of the starch to pass through a No. 40 mesh screen. The screens utilized for measurement are the U.S. Bureau of Standards sieve series. For the purpose this invention the bulk density is determined by the following procedure:

Ground starch is added to a tared 600 ml. stainless steel beaker until the beaker overflows. The beaker is then leveled and the weight in grams of the contents of the beaker is determined. The ratio of the weight in grams of the contents to the volume of the beaker is the bulk density as expressed in grams per cubic centimeter. The bulk density in pounds per cubic foot is calculated by multiplying the figure obtained by 62.4.

As stated above, I have found that my new gelatinized starch is especially suitable as a fat absorbent for use in dry bakery mixes. For such use I have found that the particle size of the starch product should be such that at least 99% of the material passes through a 40 mesh screen. I prefer that at least 75% of the material pass through a 100 mesh screen. The amount of shortening which can be satisfactorily combined with my starch product to give a dry-to-the-touch, non-caking shortening mix naturally will vary depending among other things, on the ultimate use of the mix, the storage conditions, especially humidity and temperature, the length of the storage period and the particular shortening utilized. Generally my new starch product of the general particle size described forms a dry-to-the-touch, non-caking shortening mixture with up to 4 times its weight of shortening. Thus, by using as little as 5% by weight of my new starch in a baking mix, up to 20% shortening may be included in the baking mix without allowing for the fat absorbing ability of the other dry ingredients. Accordingly, I have provided a dry-to-the-touch, noncaking shortening mix containing up to 80% shortening by weight of the new starch-shortening composition. However, when long storage periods under conditions of high relative humidity and high temperature are contemplated, it is often preferable to limit the amount of shortening to 60% of the total shortening mix. For practical purposes it is not necessary to use less than 40% shortening in the shortening composition.

Any shortening of the type used in bakery products may be employed to form my dry shortening composition. Shortenings such as the triglyceride oils or fats derived from animal sources, such as oleostearine, whale oil, fish oil, lard or edible tallow, and from plant sources, such as cottonseed oil, peanut oil, corn oil, soy oil and the like, and mixtures of the aforementioned, are suitable for use in forming my starch-shortening composition. Shortenings which have been hardened by hydrogenation, and shortenings which in their natural state are either liquids or solids at room temperature, may be used in the composition.

My new dry-to-the-touch, non-caking shortening composition may be compounded by any suitable means. The shortening may be either in the liquid or in the solid state. In any case, to obtain best results it is naturally necessary to uniformly mix the shortening with the starch. This is easily accomplished using standard mixing equipment. The mixing is typically carried out at room temperature by adding the shortening to the starch or by adding the starch to the shortening.

My new gelatinized starch naturally has a wide variety of uses other than as an absorbent for shortening. In particular, it is especially useful as a laundry starch which can be dispersed in cold water with a minimum amount of agitation.

The following examples are offered to illustrate my invention.

Example 1

Starch pellets containing 14.8% by weight moisture, based on the weight of the starch dry substance, are prepared by pelletizing in a pellet mill a mixture containing 25 parts by weight water and 400 parts by weight acid-hydrolyzed starch, the starch having been hydrolyzed with hydrochloric acid. The starch pellets are prepared for easy and convenient feeding to a conventional screw type plastics extruder of the general type described in U.S. Ser. No. 100,354. Such an extruder generally comprises a long barrel, a screw fitting within the barrel, a rotating means for the screw and a means for heating (or cooling) the material in the extruder. The extruder used in this example has a feed opening at one end of the barrel to which the pelletized starch is fed and a discharge opening or die at the opposite end of the barrel from which the gelatinized starch leaves the extruder. In the extruder used in this example the screw is 62" long, 2.5" in diameter and has a pitch of 2.5". In the first 3" of the screw (measured from the feed opening) the screw flight is 0.5", i.e. the helix rib projects radially 0.5" beyond the screw shaft. In the next 44" of the screw the flight depth decreases uniformly from 0.5" to 0.15", and in the remaining 15" of the screw the flight depth remains constant at 0.15". The die is rectangular in shape and is 2" wide, ⅛" high and ½" long.

The starch pellets previously referred to are fed into the extruder and the screw is rotated at 75 r.p.m. thus forcing the material under pressure through the extruder and out the die. The work done on the starch by the screw and the heat applied to the extruder by the external heating means convert the starch into a fluid mass during its passage through the extruder. The heat is so controlled in this example to raise the temperature of the fluid mass to about 230° C. at the die or discharge end of the extruder. During operation the pressure within the extruder, measured at the midpoint of the screw, is about 400 p.s.i.g. The product coming out of the die is a brittle, highly porous, continuous, thin sheet of congealed material. The material is allowed to cool to room temperature and then ground to pass a 40 mesh screen. The ground product obtained in this example has a bulk density of 7.9, a cold water solubility of 99.9% and a moisture content of 6.9%.

Additional examples of the preparation of my new starch products are given in Table 1. The products are prepared following the general procedure utilized in Example 1.

TABLE 1

| Example | Starch Starting Material | Moisture of Starting Material, Percent | B. D. of Product | C. W. S. of Product, Percent | Die Temperature, °C. | Moisture of Product, Percent |
| --- | --- | --- | --- | --- | --- | --- |
| 2 | Acid-hydrolyzed starch | 13.1 | 7.3 | 98 | 225 | 6.8 |
| 3 | do | 12.9 | 7.5 | 98 | 230 | 6.6 |
| 4 | do | 13.3 | 8.7 | 99 | 225 | 6.9 |
| 5 | do | 13.4 | 8.0 | 99 | 220 | 6.8 |
| 6 | do | 15.5 | 6.9 | 100 | 240 | 10.4 |
| 7 | Hypochlorite-oxidized starch | 25.5 | 9.8 | 98 | 200 | 8.0 |

Example 8

Comparative testing of the gelatinized starch of Example 1, powdered unmodified starch passed through a No. 40 mesh screen and microcrystalline cellulose passed through a No. 40 mesh screen as absorbents for fat has been carried out. The test was conducted in the following manner:

A dry-to-the-touch, non-caking shortening mix was prepared by mixing 60 grams of the gelatinized starch of Example 1 with 100 grams of corn oil. The resulting mix was judged suitable for use in dry bakery mixes. The mixing was carried out in a Hobart mixer by adding the gelatinized starch to the corn oil. This mix was used as a standard for comparison with mixes prepared with microcrystalline cellulose and with powdered unmodified starch. Table 2 shows the amount of microcrystalline cellulose and the amount of powdered unmodified starch needed to obtain dry mixes which were judged equal to the standard.

TABLE 2

| Absorbent | B.D. of Absorbent, Lbs. per Cu. Ft. | No. of Grams of Absorbent Required For 100 g. of Corn Oil |
| --- | --- | --- |
| Powdered Unmodified Starch | 32 | 300 |
| Microcrystalline cellulose | 16 | 100 |
| Gelatinized Starch | 10 | 64 |

This test shows that my gelatinized starch product is nearly twice as effective as microcrystalline cellulose and three times as effective as unmodified starch as an absorbent for fat.

Example 9

To show the effect of bulk density on the fat absorbing ability of gelatinized starches, a comparative test of a gelatinized starch having a bulk density of 5 pounds per cubic foot, a gelatinized starch having a bulk density of 10 pounds per cubic foot and a gelatinized starch having a bulk density of 18 pounds per cubic foot was carried out. Each gelatinized starch was produced from an acid-hydrolyzed starch according to the general procedure of Example 1. The test was conducted in the following manner:

A dry-to-the-touch, non-caking shortening mix was prepared by mixing 36 grams of the gelatinized starch having a bulk density of 5 pounds per cubic foot with 100 grams of corn oil. The resulting mix was judged suitable for use in dry bakery mixes. The mixing was carried out in a Hobart mixer by adding the starch to the corn oil. This mix was used as a standard for comparison with mixes prepared with the gelatinized starch having a bulk density of 10 pounds per cubic foot and the gelatinized starch having a bulk density of 18 pounds per cubic foot. Table 3 shows the amount of gelatinized starch having a bulk density of 10 and the amount of gelatinized starch having a bulk density of 18 needed to obtain dry mixes which were judged equal to the standard.

TABLE 3

| Absorbent | B.D. of Absorbent, Lbs. per Cu. Ft. | No. of Grams of Absorbent Required For 100 g. of Corn Oil |
| --- | --- | --- |
| Gelatinized Starch | 5 | 36 |
| Gelatinized Starch | 10 | 64 |
| Gelatinized Starch | 18 | 200 |

This test shows that the gelatinized starch having a bulk density of 5 is nearly two times as effective as the gelatinized starch having a bulk density of 10 and is nearly six times as effective as the gelatinized starch having a bulk density of 18 as an absorbent for fat.

Example 10

The following are the ingredients for a dry pie crust mix:

| | Grams |
| --- | --- |
| Flour | 60 |
| Lard | 38 |
| Salt | 2 |
| | 100 |

These ingredients were mixed using a Hobart C-100 mixer at low speed. After 3 minutes of mixing the material became excessively greasy and formed large clumps, making it necessary to stop the mixer. The material obtained was non-uniform and greasy to the touch and was judged unsuitable for use as a dry mix.

Example 11

To demonstrate the quality of a dry pie-dough mix incorporating my gelatinized starch product as a fat absorbent, 5 grams of the gelatinized starch of Example 1 were blended with 20 grams of lard in a Hobart mixer at low speed for 30 seconds to obtain a dry-to-the-touch, non-clumping mixture. To this mixture were then added 18 grams of lard, 55 grams of wheat flour and 2 grams of salt. The resulting mixture was blended for 2½ minutes in the Hobart mixer at low speed. The material obtained was dry to the touch and non-caking. It was judged suitable as a dry pie crust mix. A comparison of the mix of Example 10 where none of my gelatinized starch was utilized with the mix of Example 11 where 5 grams of my gelatinized starch was utilized showed the effectiveness of my new gelatinized starch as a fat absorbent in pie crust mixes.

Example 12

A dry-to-the-touch, non-caking, sweet-dough mix containing my shortening mix is prepared by mixing a dry shortening containing 4 parts by weight of the product of Example 1 with 16 parts by weight of lard with the following ingredients:

| Ingredients: | Parts by weight |
| --- | --- |
| Flour | 43.5 |
| Sugar | 22.0 |
| Non-fat milk solids | 6.0 |
| Emulsifiers | 6.0 |
| Salt | 2.5 |

The mix is dry to the touch and the shortening does not exude from the mix.

Since many embodiments of this invention may be made and since many changes may be made in the embodiments described, the foregoing is to be interpreted as illustrative only and my invention is defined by the claims appended hereafter.

I claim:

1. A dry-to-the-touch, non-caking shortening composition which comprises not more than 80% by weight of shortening and correspondingly not less than 20% by weight of a gelatinized starch, the weights based on the weight of the shortening composition, the said gelatinized starch having a particle size which is sufficiently small to allow not less than 99% of the said starch to pass through a 40 mesh screen and being characterized by a bulk density of from about 4 to about 10 pounds per cubic foot, a cold water solubility of not less than 80% and a moisture content of not more than 11% by weight based on the starch dry substance.

2. The shortening composition of claim 1 wherein the gelatinized starch is an acid hydrolyzed starch.

3. The shortening composition of claim 1 wherein the gelatinized starch is an oxidized starch.

4. The shortening composition of claim 1 wherein the gelatinized starch is a dextrinized starch.

5. A baking mix comprising a major amount of flour and a minor amount of a dry-to-the-touch, non-caking shortening composition which comprises not more than 80% by weight of shortening and correspondingly not less than 20% by weight of a gelatinized starch, the weights based on the weight of the shortening composition, the said gelatinized starch having a particle size which is sufficiently small to allow not less than 99% of the said starch to pass through a 40 mesh screen and being characterized by a bulk density of from about 4 to about 10 pounds per cubic foot, a cold water solubility of not less than 80% and a moisture content of not more than 11% by weight based on the starch dry substance.

6. The shortening composition of claim 1 wherein said composition comprises not more than 60% by weight of shortening and correspondingly not less than 40% by weight of gelatinized starch.

References Cited

UNITED STATES PATENTS

| | | | |
|---|---|---|---|
| 2,919,986 | 1/1960 | Johnson | 99—94 |
| 3,137,592 | 6/1964 | Protzman et al. | 127—32 |
| 2,567,815 | 9/1951 | Kipnis | 99—94 |
| 2,876,160 | 3/1959 | Schock et al. | 167—82 |

MAURICE W. GREENSTEIN, *Primary Examiner.*